April 14, 1931.                F. A. SHORT                 1,800,266
                          EYEGLASS CONSTRUCTION
                    Filed Jan. 6, 1927        2 Sheets-Sheet 1
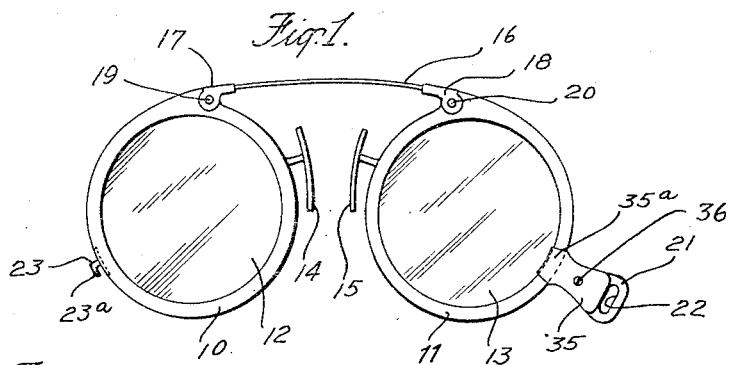
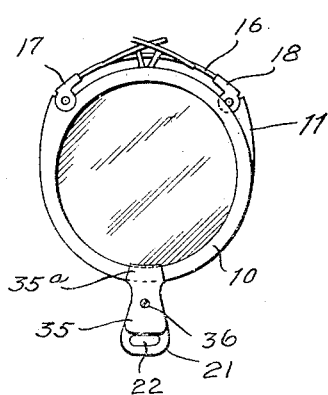
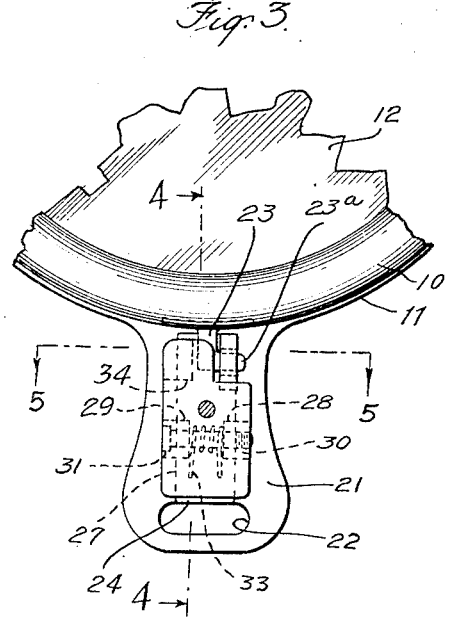
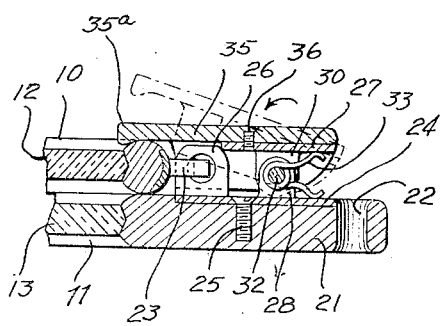
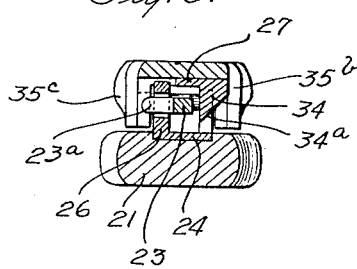
INVENTOR
Frank A. Short
BY
Robert L. Blair ATTORNEY

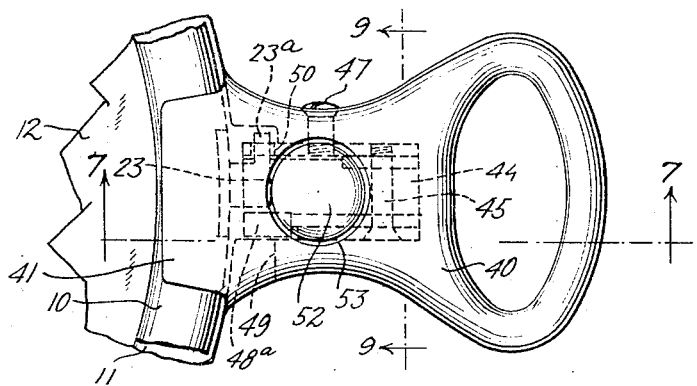
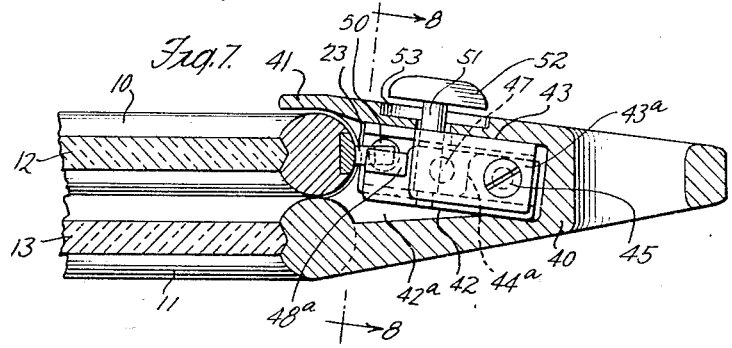
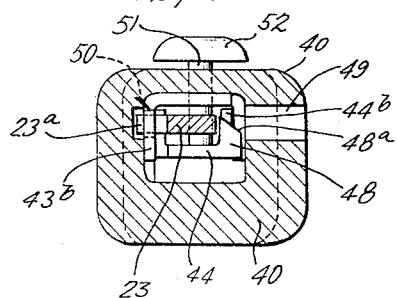
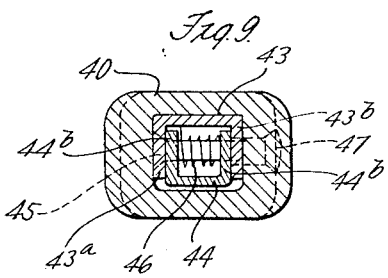

Patented Apr. 14, 1931

1,800,266

UNITED STATES PATENT OFFICE

FRANK A. SHORT, OF HILLSIDE, NEW JERSEY

EYEGLASS CONSTRUCTION

Application filed January 6, 1927. Serial No. 159,302.

This invention relates to eyeglass construction and more particularly to eyeglass frames of the folding Oxford type or the like.

One of the objects of the invention is to provide a construction of the above nature which is practical and efficient, capable of meeting the requirements of use in a highly satisfactory manner. Another object is to provide a folding eyeglass frame having a highly satisfactory means for holding the frame in folded position. Another object is to provide a catch for holding the frame in folded position which is dependable in action and conveniently operated. Another object is to provide a device of the above nature which is simple in construction and which is neat and attractive in appearance. Other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

In the accompanying drawings which shows one or more of the various possible embodiments of this invention, Figure 1 shows a pair of eyeglasses of the folding Oxford type, in unfolded position;

Figure 2 shows the eyeglasses of Figure 1 in folded position;

Figure 3 is a view in enlarged detail of the bottom portion of Figure 2, one of the parts being removed to better show the structure;

Figure 4 is a section taken substantially along the line 4—4 of Figure 3;

Figure 5 is a section taken substantially along the line 5—5 of Figure 3;

Figure 6 is a view similar to Figure 3 and showing a modified form of construction;

Figure 7 is a section taken substantially along the line 7—7 of Figure 6;

Figure 8 is a section taken substantially along the line 8—8 of Figure 7, and

Figure 9 is a section taken substantially along the line 9—9 of Figure 6.

Similar reference characters refer to similar parts throughout the several views of the drawing.

Referring now to the drawing in detail, there is shown in Figure 1 a pair of eyeglasses of the Oxford type having a pair of rims 10 and 11 in which are carried lenses 12 and 13. The rims 10 and 11 are, in the embodiment shown, made of non-metallic material such as celluloid or other similar material employed in the construction of eyeglass parts. The rims are shown provided with nose pieces 14 and 15 which may be of any desired or well-known form.

This eyeglass frame is adapted to be folded into the position shown in Figure 2 wherein the rims are positioned one over the other, with the lenses face to face. The rims are connected by a bridge member 16 which is joined to the respective rims 10 and 11 as by suitable terminal connections 17 and 18. The terminals of the bridge 16 are preferably pivoted to the eyeglass rims as is indicated by the pivot pins 19 and 20 and, preferably, there are associated with these pivotal connections spring means which tend to hold the parts in the extended or unfolded position shown in Figure 1. Such constructions of various types are well-known, and it is thought unnecessary that they be described in detail herein since, of themselves, they form no part of the present invention. It will be readily understood that the bridge 16, with its connections and associated parts, is such that it permits the eyeglass rims to be folded into the position shown in Figure 2 and continually urges them to spring back to the unfolded position shown in Figure 1. In the embodiment shown in the drawing, the bridge member 16 is a flat spring member and is bent to some extent when the frame is folded so that it also tends to cause the frame to spring into unfolded position.

One of the rims, as the rim 11, is provided with a handle or finger grip 21 in the outer end portion of which is provided an eye 22 for the attachment of a suitable ribbon or other means, if desired. This handle member 21 also carries a device for cooperating with the rim 10 to hold the eyeglass frame in the folded position shown in Figure 2, against the action of the spring means tending to unfold it. As shown in Figure 1, the rim 10 carries a part 23 which, when the eyeglasses are folded, comes into position to cooperate with a catch mechanism carried by the handle part 21. This part 23 is preferably of metal, being secured to the non-metallic rim member in any desired manner, and comprises a projection or lug projecting outwardly substantially radially from the periphery of the rim and having projecting from one side thereof a part 23a which extends in a direction substantially lengthwise of the eyeglass rim and which is spaced therefrom.

As shown in Figure 4, the handle member 21 is, in this instance, preferably of nonmetallic material and formed integrally with the rim member 11. Upon the surface of this part 21 is a metal plate 24, secured thereon by any suitable means such as a screw 25. This plate 24 carries an upstanding lug 26 which forms an eye adapted to receive and embrace the projecting part 23a of the lug 23. Pivoted upon the surface of the plate 24 is a metal plate 27. The pivotal connection may be formed, for example, by a pair of lugs 28 and 29 projecting from the surface of the plate 24 and a pair of lugs 30 and 31 projecting from the surface of the plate 27, and a pivot pin 32 passing through these lugs. A spring 33 coiled about the pin 32 urges the plate 27 to swing in the direction indicated by the arrow in Figure 4.

The front end of the plate 27, that is the end thereof adjacent to the eyeglass rim, carries a depending projection or lug 34 which is best seen in Figure 5. When the eyeglass frame is in folded position, this lug 34 engages the side of the lug 23 opposite to the projection 23a thereof and holds the frame against opening. The part 34 is provided with a beveled face 34a which is in the path of movement of the lug 23 when the eyeglass rims are moved into folded position. Thus, when the eyeglasses are folded, the lug 23, striking the beveled surface 34a, raises the catch about the pivot 32 and, as soon as the part 23a has entered the eye 26, the parts snap into the position shown in Figure 5, locking the eyeglass frame in folded position against the action of the spring means tending to unfold it.

The metal plate 27 is preferably covered by a non-metallic member 35 which may be secured in any suitable manner as by a screw 36. This non-metallic part 35 extends forwardly beyond the end of the plate 27, at 35a, and receives therebeneath the portion of the rim 10 having thereon the lug 23. The non-metallic part 35 is also preferably provided with depending side walls 35b and 35c. These depending sides substantially conceal all of the metal parts of the catch.

To fold the eyeglasses, the rim 10 is swung around and over the rim 11 and guided beneath the part 35a. The part 23a enters the eye 26, and the lug 34 of the catch snaps into place to lock the frame in folded position. It will be seen that the catch affords a positive lock, insuring dependable holding. The eye 26 holds the rims against slipping out of proper relation, and the lug 34, held in locking position by the spring 33, affords a positive and thoroughly reliable holding. In order to unfold the eyeglasses, it is necessary simply to press downwardly upon the surface of the part 35 rearwardly of the pivot 32, thereby swinging the part 34 out of the path of the lug 23. The eyeglass frame will then automatically spring to open position under the urge of the spring means embodied in the bridge 16 and its connecting parts. The pivot 32 is preferably placed well toward the rear end of the catch so that only a small leverage is available for releasing the catch. In this manner danger of the catch being accidentally released is substantially avoided.

Referring now to Figures 6—9, there is shown a modified form of catch for holding the eyeglass frame in folded position. In Figures 6 and 7 there are shown the two rims 10 and 11 in folded position one over the other. The rim 10, as in the previously described embodiment, is provided with the projecting metal lug 23 and the part 23a thereof which projects lengthwise of the rim. The rim 11 is provided with a projecting handle member 40 which is preferably of nonmetallic material formed integrally with the rim 11, as clearly brought out in Figure 7. This handle member 40 has an inwardly projecting part 41, preferably formed integrally therewith, beneath which is received the portion of the rim 10 carrying the lug 23.

The handle member 40 has formed therein a recess 42 which opens inwardly toward the eyeglass rims. In this recess is positioned the spring catch for cooperating with the lug 23 to hold the frame in folded position. The assembled catch mechanism is substantially box-shaped and fits snugly within the recess 42, being inserted thereinto from the inner open end of the recess.

Considering the construction of this catch, it comprises an upper member 43 having depending side walls 43a and 43b, and a lower member 44 having upstanding side walls 44a and 44b fitting between the side walls of the part 43. A pivot screw 45 passes through the four sides walls, and about this screw is coiled a spring 46 which holds the parts in the position shown in the drawing. The upper member 43 is preferably secured to the handle member 40, for example by means of a screw 47 which passes inwardly from the side of the handle and is threaded into the side wall 43b.

The screw 47 holds the catch mechanism in position within the recess 42, the upper part 43 preferably resting snugly against the upper wall of the recess, as shown in Figure 7. The recess is of sufficient depth to leave a clearance 42a beneath the inner end of the lower member 44 so that the lower member 44 may be swung downwardly about the pivot 45 against the action of the spring 46. It will be seen that the part 44 is, in effect, pivoted upon the nonmetallic handle member 40 being pivoted upon the metal part 43 which is rigidly secured to the handle member.

At the inner end of the pivoted member 44, that is, at its end nearest the rim 11, the side wall 44b thereof is shaped to provide a lug 48 having a beveled face 48a. As shown in Figure 8, the non-metallic material of the handle member 40 is cut away to provide a passage 49 through which the lug 23 of the rim 10 moves as the frame is folded. As shown in Figure 7, the side wall 43a of the fixed part 43 is discontinued adjacent the lug 48 to permit passage of the lug 23. The opposite side wall 43b is provided with an opening or eye 50 to receive and guide the projection 23a of the lug 23.

In folding the eyeglass frame, the rim 10 is slipped beneath the handle part 41 and is moved along therebeneath. The lug 23 slides through the passage 49 and engages the beveled surface 48a, depressing the pivoted catch member 44. The part 23a enters the eye 50 and, as soon as the lug 23 has passed over the lug 48, the catch 44, under the urge of the spring 46, springs back to the position shown in the drawing. The lug 48 of the pivoted catch 44 engages with the surface of the lug 23 opposite to the projection 23a thereof and holds the eyeglass frames in folded position against the action of the spring means embodied in the bridge and tending to unfold them.

In order to unfold the frame, it is necessary merely to swing the catch member 44 downwardly about its pivot 45 until the lug 48 clears the lug 23, whereupon the frame will snap into open position. A post 51 is threaded into the catch member 44 and, passing upwardly through the part 43 and through the upper wall of the handle member 40, this post is provided at its upper or outer end with an enlarged head or button 52. By depressing this button 52, the catch member 44 is swung downwardly to release the lug 23. Preferably, the non-metallic material of the handle member is recessed beneath the button 52, as shown at 53, so that sufficient clearance is provided for movement of the button without its projecting objectionably above the surface of the handle member.

In order to remove the catch mechanism from the handle member, it is necessary simply to remove the screw 47 and the post 51, whereupon the entire catch mechanism may be removed from the recess as a unit. It will be seen that the assembly of this construction is very conveniently accomplished, the catch mechanism being completely assembled and then slipped into the recess prepared to receive it.

From the foregoing it will be seen that there is herein provided a construction which achieves the objects of this invention, including many practical advantages. The eyeglass frame is dependably held in folded position and may be opened for use with the greatest convenience. The parts are such that they are not subject to excessive wear and liability of getting out of order or requiring repair.

As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim as my invention:—

1. In eyeglass construction, a folding frame comprising, in combination, a pair of lens carrying rims, means connecting said rims adapted to permit them to swing together into folded position and including spring means tending to unfold them, and means adapted to hold said rims in folded position against the action of said spring means, said last means comprising a lug extending outwardly substantially radially from one of said rims and having a part projecting from one side thereof and extending therefrom substantially lengthwise of said rim but spaced from said rim, and means upon the other of said rims adapted to coact with said lug and including a means adapted to be received within the space between the projecting part of said lug and said rim, and a spring-pressed pivoted catch adapted to drop into holding position on the side of said lug remote from said projecting part thereof.

2. In eyeglass construction, a folding frame comprising, in combination, a pair of lens carrying rims, means connecting said rims adapted to permit them to swing together into folded position and including spring means tending to unfold them, and means adapted to hold said rims in folded position against the action of said spring means, said last means comprising a lug extending outwardly substantially radially from one of said rims and having a part projecting from one side thereof and extending therefrom substantially lengthwise of said rim but spaced from said rim, a handle member projecting outwardly from the other of said rims and having a part adapted to receive therebeneath the portion of said first rim having said lug thereon, and means upon said handle member adapted to coact with said lug and including means adapted to be received within the space between the projecting part of said lug and said rim and a spring-pressed pivoted catch adapted to drop into holding position on the side of said lug remote from said projecting part thereof.

3. In eyeglass construction, a folding frame comprising, in combination, a pair of lens carrying rims, means connecting said rims adapted to permit them to swing together into folded position and including spring means tending to unfold them, and means adapted to hold said rims in folded position against the action of said spring means, said last means comprising a handle member upon one of said rims having a part adapted to receive therebeneath a portion of the other of said rims, a swinging spring-pressed catch mounted upon said handle, and means upon said other rim adapted to be engaged by said swinging catch.

4. In eyeglass construction, a folding frame comprising, in combination, a pair of lens carrying rims, means connecting said rims adapted to permit them to swing together into folded position and including spring means tending to unfold them, and means adapted to hold said rims in folded position against the action of said spring means, said last means comprising a lug extending outwardly substantially radially from one of said rims, a handle member upon the other of said rims, a part upon said handle member adapted to receive therebeneath the portion of said first rim having said lug thereon, and a catch upon said handle member comprising a swinging member urged into engagement with said lug by a coiled spring.

5. In eyeglass construction, a folding frame comprising, in combination, a pair of lens carrying rims, means connecting said rims adapted to permit them to swing together into folded position and including spring means tending to unfold them, and means adapted to hold said rims in folded position against the action of said spring means, said last means comprising a lug extending outwardly substantially radially from one of said rims and having a part projecting from one side thereof and extending therefrom substantially lengthwise of said rim but spaced from said rim, and means upon the other of said rims adapted to coact with said lug and including a part adapted to receive said projecting part of said lug and a pivoted catch urged by spring means into engagement with said lug.

6. In eyeglass construction, a folding frame comprising, in combination, a pair of lens carrying rims, means connecting said rims adapted to permit them to swing together into folded position and including spring means tending to unfold them, and means adapted to hold said rims in folded position against the action of said spring means, said last means comprising a lug extending outwardly substantially radially from one of said rims and having a part projecting from one side thereof and extending therefrom substantially lengthwise of said rim but spaced from said rim, and means upon the other of said rims adapted to coact with said lug and including a part adapted to receive and substantially embrace said projecting part of said lug, a pivoted catch adapted to swing into locking position upon the side of said lug remote from said projecting part, and spring means urging said catch to swing into said locking position.

7. In eyeglass construction, a folding frame comprising, in combination, a pair of lens carrying rims, means connecting said rims adapted to permit them to swing together into folded position and including spring means tending to unfold them, and means adapted to hold said rims in folded position against the action of said spring means, said last means comprising a lug extending outwardly substantially radially from one of said rims and having a part projecting from one side thereof and extending therefrom substantially lengthwise of said rim but spaced from said rim, a handle member upon the other of said rims, a fixed eye upon said handle member positioned to receive said projecting part of said lug, and a movable spring-pressed latch upon said handle member adapted when said projecting part has entered said eye to spring into locking position on the side of said lug remote from said projecting part thereof.

8. In eyeglass construction, a folding frame comprising, in combination, a pair of lens carrying rims of non-metallic material, means connecting said rims adapted to permit them to be swung together into folded position and including spring means tending to unfold them, and means adapted to hold said rims in folded position against the action of said spring means, said last means comprising a metal lug extending outwardly substantially radially from one of said rims and having a part projecting therefrom and extending substantially lengthwise of said rim but spaced from said rim, a handle member of non-metallic material upon said other rim, a metal part upon said handle member adapted to receive said projecting part of said lug, and a swinging metal part upon said handle member adapted to swing into locking engagement with said lug.

9. In eyeglass construction, a folding frame comprising, in combination, a pair of lens carrying rims of non-metallic material, means connecting said rims adapted to permit them to be swung together into folded position and including spring means tending to unfold them, and means adapted to hold said rims in folded position against the action of said spring means, said last means comprising a metal lug extending outwardly substantially radially from one of said rims and having a part projecting therefrom and extending substantially lengthwise of said rim but spaced from said rim, a handle member of non-metallic material upon said other rim, a metal part upon said handle member adapted to receive said projecting part of said lug, and a pivoted metal part upon said handle member adapted to swing into locking engagement with said lug, said metal parts being concealed in a recess formed in the non-metallic material of said handle member.

10. In eyeglass construction, a folding frame comprising, in combination, a pair of lens carrying rims of non-metallic material, means connecting said rims adapted to permit them to be swung together into folded position and including spring means tending to unfold them, a handle member of non-metallic material upon one of said rims, a metal part positioned upon the periphery of the other of said rims, a swinging metal part upon said handle member adapted to swing into engagement with said first metal part to lock said rims in folded position against the action of said spring means, said swinging metal part being mounted in a recess in the non-metallic material of said handle member and being substantially concealed thereby.

11. In eyeglass construction, a folding frame comprising, in combination, a pair of rims, means connecting said rims adapted to permit them to swing together into folded position and including spring means tending to unfold them, and means adapted to hold said rims in folded position against the action of said spring means, said last means comprising a handle member upon one of said rims having a part adapted to receive thereunderneath a portion of the other of said rims, a spring pressed pivoted catch mounted in a recess in said handle member, means upon said other rim member adapted to be engaged by said catch, and means for releasing said catch comprising a part projecting outwardly from said handle and adapted to be depressed to swing said catch about its pivot.

12. In eyeglass construction, a catch for a folding eyeglass frame having a handle comprising, in combination, a member positioned in a recess in the handle having at one end a projecting lug and mounted to swing about its other end, means on the frame adapted to be engaged by said lug to hold the frame folded, spring means urging said lug to swing into engagement with said last means, and a part projecting from said member at an intermediate portion thereof and adapted to be depressed to swing said member against the action of said spring means.

13. In a folding eyeglass frame comprising a pair of rims adapted to swing one over the other, and a handle on one of said rims, a catch for holding said frame folded comprising, in combination, a swinging catch member mounted in a recess in said handle, means on the other rim to be engaged by said catch member, spring means urging said catch member to swing into operative position, a post connected to said swinging member and projecting outwardly through said handle, and an enlarged head on said post adapted to be depressed to swing and release said catch.

14. In a folding eyeglass frame comprising a pair of rims adapted to swing one over the other, and a handle on one of said rims, a catch for holding said frame folded comprising, in combination, a metal member removably secured in a recess in said handle member, a swinging catch member pivoted upon said metal member, and means upon the other rim to be engaged by said catch member.

15. In a folding eyeglass frame comprising a pair of rims adapted to swing one over the other, and a handle on one of said rims, a catch for holding said frame folded comprising, in combination, a pin mounted transversely in said handle member, a swinging catch member pivoted upon said pin, means upon the other rim to be engaged by said catch member, and a spring coiled about said pin and connected to urge said catch member to swing toward engagement with said last means.

16. In a folding eyeglass frame comprising a pair of rims adapted to swing one over the other, and a handle on one of said rims, a catch for holding said frame folded comprising, in combination, a metal member removably secured in a recess in said handle member and having a pair of spaced walls, a pin extending between said walls, a swinging catch member pivoted by said pin, means upon the other rim to be engaged by said catch member, and a spring coiled about said pin and connected to urge said catch member to swing into engagement with said last means.

17. In a folding eyeglass frame comprising a pair of rims adapted to swing one over the other, and a handle on one of said rims, a catch for holding said frame folded comprising, in combination, a metal member removably secured in a recess in said handle member, a swinging catch member pivoted upon said metal member, means upon the other rim to be engaged by said catch member, spring means urging said catch member toward operative position, and a part connected to said catch member and projecting outwardly through the handle member adapted to be depressed to swing said catch member against the action of said spring means.

18. In a folding eyeglass frame comprising a pair of rims adapted to swing one over the other, and a handle on one of said rims, a catch for holding said frame folded comprising, in combination, a metal member removably secured in a recess in said handle member, a swinging catch member pivoted upon said metal member, means upon the other rim to be engaged by said catch member, and coacting means upon said last rim and said metal member for preventing movement of said last rim in a direction radially away from said handle.

19. In a folding eyeglass frame comprising a pair of rims adapted to swing one over the other, and a handle on one of said rims, a catch for holding said frame folded comprising, in combination, a member immovably mounted upon said handle, a spring-pressed member pivotally attached to said first member, a lug upon the other rim adapted to interlock with a portion of said second member, and means upon said immovable member adapted to coact with said lug to hold said other rim against movement in a direction radially away from said handle.

20. In eyeglass construction, in combination, a folding frame, a handle member carried by said frame, a catch mounted wholly within the handle member, an interlocking means upon the frame adapted to coact with said catch to hold said frame in a folded position, said catch comprising a spring-pressed catch member disposed within a recess in said handle member having at its inner end means for engaging said interlocking member, and pivotally mounted wholly within said handle at a point adjacent its outer end, and means connected to said member between the ends thereof and projecting from the surface of said handle member adapted to be depressed to swing said catch member wholly within said handle member for releasing said catch.

In testimony whereof, I have signed my name to this specification this 5th day of January, 1927.

FRANK A. SHORT.